No. 889,058. PATENTED MAY 26, 1908.
N. ST. PETER.
SAND OR OTHER SPRINKLING MACHINE.
APPLICATION FILED DEC. 19, 1907.

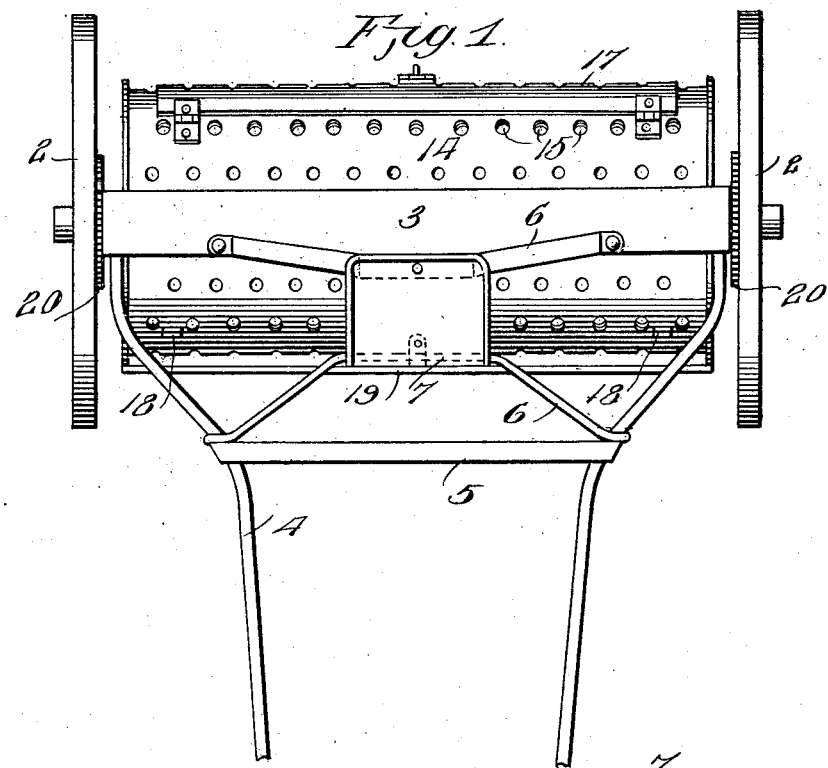
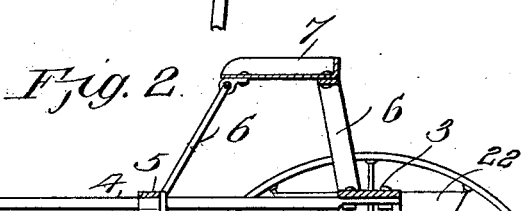
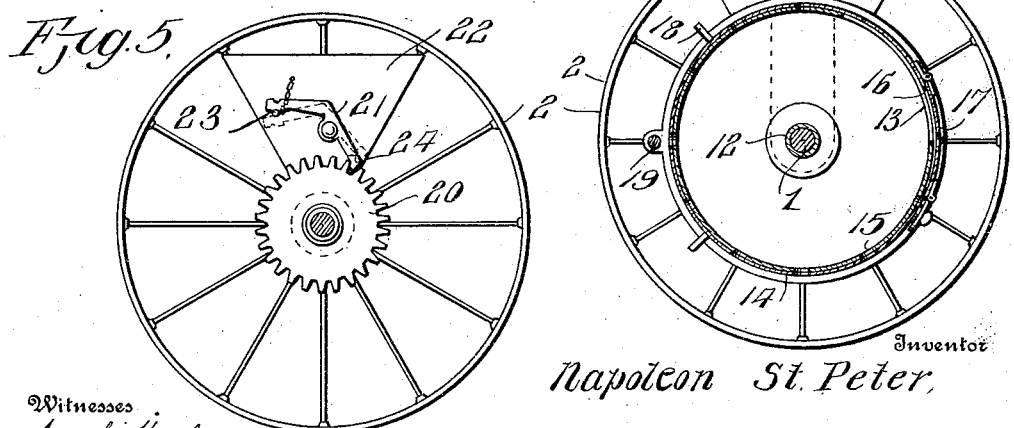

3 SHEETS—SHEET 2.

Witnesses
Frank Hough
C. Bradway

Inventor
Napoleon St. Peter
By Victor J. Evans
Attorney

No. 889,058. PATENTED MAY 26, 1908.
N. ST. PETER.
SAND OR OTHER SPRINKLING MACHINE.
APPLICATION FILED DEC. 19, 1907.

Witnesses
Frank Hough
C. Bradway.

Inventor
Napoleon St. Peter,
By Victor J. Evans
Attorney

UNITED STATES PATENT OFFICE.

NAPOLEON ST. PETER, OF FAIRFIELD, MAINE, ASSIGNOR OF ONE-HALF TO DAVID KING, OF FAIRFIELD, MAINE.

SAND OR OTHER SPRINKLING MACHINE.

No. 889,058.      Specification of Letters Patent.      Patented May 26, 1908.

Application filed December 19, 1907. Serial No. 407,257.

*To all whom it may concern:*

Be it known that I, NAPOLEON ST. PETER, a citizen of the United States, residing at Fairfield, in the county of Somerset and State of Maine, have invented new and useful Improvements in Sand or Other Sprinkling Machines, of which the following is a specification.

This invention relates to a machine for sprinkling sand on icy sidewalks or for distributing chemical fertilizer or lime in powdered form, and for similar purposes.

The invention has for one of its objects to improve and simplify the construction and operation of apparatus of this character so so as to be comparatively easy and inexpensive to manufacture, thoroughly reliable and efficient in use, and easy to manipulate.

A further object of the invention is the provision of a sprinkling or distributing machine comprising a pair of concentric drums each provided with perforations and relatively adjustable so as to throw the perforations into or out of register for controlling the discharge of sand or other material.

A further object of the invention is the provision of a wheeled vehicle on the axle on which the drums are mounted, in combination with means for connecting or disconnecting the drums with one or both traction wheels for rotating the drums by the movement of the vehicle so as to effectively discharge the material upon the sidewalk to be sanded or ground to be fertilized.

With these objects in view and others, as will appear as the description proceeds, the invention comprises the various novel features of construction and arrangement of parts which will be more fully described hereinafter and set forth with particularity in the claims appended hereto.

Figure 3:
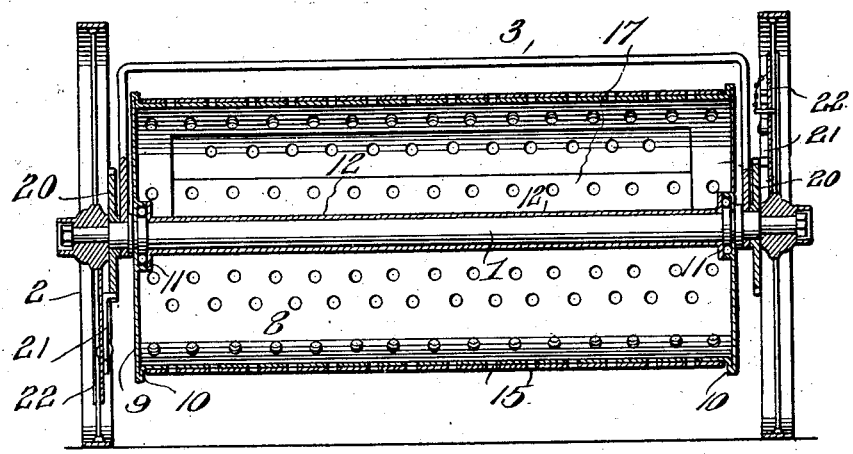
Figure 4:
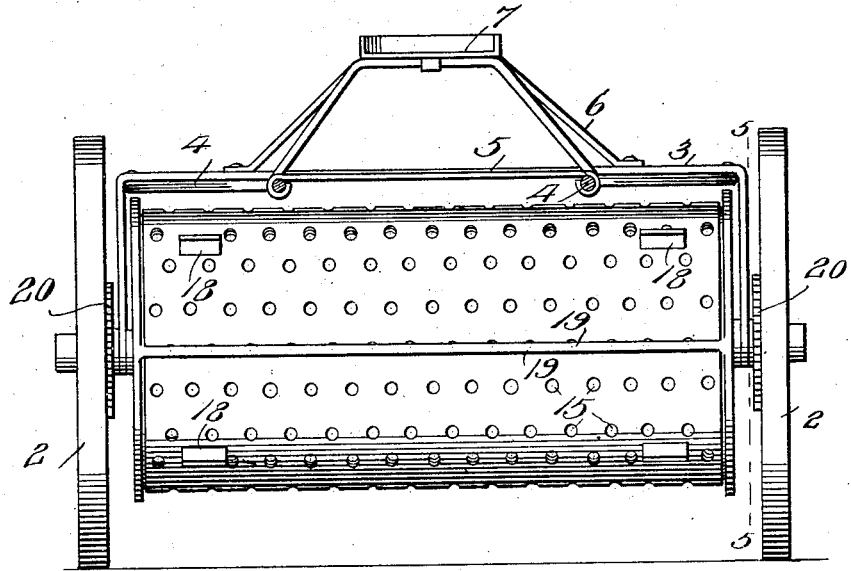

In the accompanying drawings, which illustrate one of the embodiments of the invention, Figure 1 is a plan view of the machine. Fig. 2 is a section taken transversely through the drums. Fig. 3 is a section taken longitudinally through the drums. Fig. 4 is a rear view of the machine. Fig. 5 is a section of line 5—5, Fig. 4. Fig. 6 is a perspective view of a modified form of sprinkling machine. Fig. 7 is a section thereof taken transversely through the drums. Fig. 8 is a sectional view showing one of the traction wheels.

Similar reference characters are employed to designate corresponding parts throughout the several views.

Referring to the drawings, 1 designates an axle on the ends of which are traction wheels 2 removably secured. Mounted on the axle is an inverted U-shaped cross member 3 to which are secured the rear ends of the thills 4 which latter are braced one to the other by the cross piece 5 so as to give rigidity. Supported on the member 3 and thills 4 by the irons 6 is a driver's seat 7.

Mounted on the axle 1 is a cylinder or drum 8 which is closed at its ends by heads 9 and provided with peripheral flanges 10 at the ends. The ball bearings 11 are provided to reduce the friction between the drum and axle, and in order to prevent material from entering the bearings, the axle is covered by a tube 12. As shown in Fig. 2, the drum 8 has a filling opening 13 through which material is supplied to the drum. On the drum 8 is an outer drum or cylinder 14 which is open at its ends and which is confined between the flanges 10 of the inner drum so that relative longitudinal movement of the drums is prevented, whereby the apertures 15 of the two drums will be maintained in alinement. The apertures of the drums are so distributed that by a relative rotary movement, the apertures can be thrown completely into or out of register or in only partial registration for varying the discharge of material from the drum. The outer drum has an opening 16, Fig. 2, which, when registering with the opening 13, will permit material to be supplied to the inner drum, the opening 16 being normally closed by a hinged cover 17 extending approximately the full length of the drum. In order to readily adjust the drums, the outer drum is provided with grips 18 arranged adjacent the ends and at opposite sides of a cross bar 19 fixed at its ends to the inner drum. Thus by gripping the bar in one hand and one of the grips 18 in the other hand, the drums can be given a relative rotary movement so as to bring the apertures into or out of register.

In order to rotate the drums by means of the traction wheels 2, ratchet and pawl devices are employed. Secured to the drum 8 are ratchet wheels 20 disposed between the traction wheels 2 and the ends of the drum, and coöperating with each ratchet wheel is a pawl 21 mounted on a plate 22 secured to the adjacent traction wheel 2 so that the pawl will, when in engagement with the ratchet wheel, lock the drum with the wheel 2. The pawl can be secured in engaged position in any suitable manner, as for instance, by means of a pin 23 which is inserted in an opening in the plate 22 so as to hold the nose 24 of the pawl in engagement with the teeth of the ratchet wheel. When it is not desired to rotate the drum, as in transporting the machine from one point to another, the pawl 21 can be held in disengaged position by removing the pin 23 and engaging it over the free arm of the pawl, as shown by dotted lines in Fig. 5. Either one or both of the pawls can be thrown into locking position at one time when it is desired to distribute the material by the rotation of the drums.

Referring to Figs. 6 to 8 inclusive, the inner drum 24 is provided with the end flanges 25 between which is arranged the outer drum 26. This outer drum is composed of two sections 27 and 28, each of semi-cylindrical form, and the sections are hingedly-connected at 29 so that the outer drum can be readily taken off for the purpose of cleaning. The section 27 is provided with brackets 30 to which are hingedly connected bolts 31, and on the section 28 are slotted lugs 32 into which the bolts 31 extend, there being wing nuts 33 on the bolts which bear against the lugs to hold the outer drum firmly in place. The outer drum is provided with a door 34 for covering the filling opening, the door being connected with the drum by hinges 35 and held closed by turn buttons 36. Disposed within the inner drum are rods 37 supported on the heads of the drum and disposed in such a position as to break up the lumps of frozen sand or other material as the drum rotates. These rods, besides forming pulverizers, serve as stiffening members for the drum.

Rotating with the drum 24 is a ratchet wheel 38 with which coöperates a spring-pressed pawl 39 on the traction wheel 40, so that the drum can be rotated with the wheel. If desired, a ratchet wheel and pawl may be employed between the drum and each wheel of the vehicle. When it is necessary to release the drum so that the vehicle can be moved from place to place without the drum turning, a pin 41 is engaged in an opening 42 in the arm 43 of the wheel hub so as to hold the pawl out of engagement with the ratchet wheel. On the outer drum are grips 44 whereby the said drum can be turned between the apertures of the drums into register when it is desired to sprinkle the contents of the inner drum over the ground.

On the ends of the axle 45 are bearings 46 that have diverging lugs 47 and to each bearing is attached a V-shaped frame 48. On the V-shaped frames 48 is mounted a U-shaped frame 49 disposed horizontally and arranged with its side arms 50 at opposite sides of the traction wheels 40 and having secured to their front ends the thills or shafts 51. Secured to the rear ends of the thill are cross pieces 52 and 53. To these cross pieces are attached a seat-supporting bar 54 that extends upwardly and rearwardly and has mounted thereon the driver's seat 55 and this seat is braced by a V-shaped frame 56 attached to the rear portion of the U-shaped frame 49. This construction of the body of the vehicle is comparatively simple and inexpensive and of durable design.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims.

Having thus described the invention, what I claim is:—

1. In a machine of the class described, the combination of an axle, traction wheels mounted thereon, a perforated drum mounted on the axle, means for locking the drum to one of the wheels, a perforated outer drum composed of separate sections, means for locking the sections together, and means for producing a relative turning movement of the drums to throw the perforations thereof into or out of register.

2. In a machine of the class described, the combination of an axle, traction wheels thereon, a perforated drum on the axle and provided with peripheral flanges, a perforated outer drum open at its ends and disposed between the said flanges, the outer drum being composed of hingedly connected sections, and means for removably holding the outer drum in position.

3. In a machine of the class described, the combination of an axle, a perforated drum mounted thereon, rods disposed within the drum and having their ends secured to the heads of the latter to form pulverizing means, an outer perforated drum frictionally secured around the inner drum, means for turning one drum on the other, and means for rotating the drums.

4. In a machine of the class described, the combination of an axle, a sprinkling device mounted thereon, and comprising two relatively movable perforated drums, bars on one of the drums disposed parallel with said axle to form pulverizing devices, traction wheels, means for locking the device to one of the wheels, bearings for the ends of the axle, frames secured to the bearings, a main frame mounted on the first-mentioned frames, thills connected with the main frame, and a driver's seat mounted on the main frame.

5. In a machine of the class described, the combination of an axle, traction wheels thereon, a drum on the axle having heads through which the axle passes, a headless drum mounted on the first-mentioned drum, said drums being provided with apertures adapted to be thrown into or out of register, means for locking the drums to the traction wheels to turn therewith, and thills connected with the axle.

6. In a machine of the class described, the combination of an axle, traction wheels thereon, a perforated drum having peripheral flanges at its ends, a perforated drum rotatably mounted on the first drum and prevented from longitudinal movement by the flanges, a door on the outer drum for permitting material to be supplied to the inner drum, a draft device attached to the axle, and a driver's seat supported on the draft device.

7. In a machine of the class described, the combination of an axle, traction wheels on the axle, a perforated drum disposed between the wheels and rotatably mounted on the axle, ball bearings between the axle and drum, a tubular member incasing the axle for preventing material from entering the bearings, peripheral flanges on the drum, a perforated outer drum retained between the said peripheral flanges and mounted for relative rotation on the inner drum, means for locking the drums to the traction wheels, and a draft device connected with the axle.

In testimony whereof I affix my signature in presence of two witnesses.

NAPOLEON ST. PETER.

Witnesses:
　JEROME LECLAIR,
　EUGENE BUDBURY.